US005121534A

United States Patent [19]

Kruzich

[11] Patent Number: 5,121,534

[45] Date of Patent: Jun. 16, 1992

[54] METHOD OF ASSEMBLING A UNITIZED WINDOW SYSTEM FOR A VEHICLE DOOR

[75] Inventor: J. K. Kruzich, Ann Arbor, Mich.

[73] Assignee: Ford Motor Company, Dearborn, Mich.

[21] Appl. No.: 712,011

[22] Filed: Jun. 7, 1991

Related U.S. Application Data

[62] Division of Ser. No. 561,856, Jul. 30, 1990, Pat. No. 5,035,083.

[51] Int. Cl.$^{5}$ .............................................. B23Q 17/00

[52] U.S. Cl. ........................................ 29/407; 29/434; 29/469; 29/897.2

[58] Field of Search ................. 29/429, 434, 469, 407, 29/897.2; 49/348, 349, 352, 374, 502; 296/146

[56] References Cited

U.S. PATENT DOCUMENTS

| | | | |
|---|---|---|---|
| 2,390,617 | 12/1945 | Rappl | 92/14 |
| 2,432,799 | 12/1947 | Rappl | 49/349 |
| 2,464,609 | 3/1949 | Rappl | 49/374 X |
| 2,524,714 | 10/1950 | Rappl | 74/625 |
| 2,582,394 | 1/1952 | Rappl | 49/349 |
| 3,022,064 | 2/1962 | Russell | 49/26 |
| 3,703,053 | 11/1972 | De Rees et al. | 49/440 X |
| 4,222,202 | 9/1980 | Pigeon | 49/352 |
| 4,237,657 | 12/1980 | Kazewych | 49/352 |
| 4,253,277 | 3/1981 | Campbell et al. | 49/352 |
| 4,314,692 | 2/1982 | Brauer et al. | 254/362 |
| 4,364,202 | 12/1982 | Zavatkay | 49/352 |
| 4,433,509 | 2/1984 | Seppala | 49/352 |
| 4,483,100 | 11/1984 | Blankenburg et al. | 49/352 |
| 4,503,732 | 3/1985 | Schust | 74/625 |
| 4,547,993 | 10/1985 | Kobayashi et al. | 49/352 |
| 4,642,941 | 2/1987 | Staran et al. | 49/352 |
| 4,656,780 | 4/1987 | Miyauchi et al. | 49/352 X |
| 4,660,325 | 4/1987 | Bauer et al. | 49/352 |
| 4,671,013 | 6/1987 | Friese et al. | 49/380 |
| 4,672,771 | 6/1987 | Lam et al. | 49/352 |
| 4,744,172 | 5/1988 | Miyauchi | 49/349 |
| 4,785,585 | 11/1988 | Grier et al. | 49/349 X |
| 4,793,099 | 12/1988 | Friese et al. | 49/352 X |
| 4,794,734 | 1/1989 | Stempien | 49/348 |
| 4,813,304 | 3/1989 | Kobayashi | 49/352 X |
| 4,819,377 | 4/1989 | Bauer et al. | 49/221 |
| 4,839,990 | 6/1989 | Lam et al. | 49/352 |
| 4,920,697 | 5/1990 | Vail et al. | 49/352 X |
| 4,934,099 | 6/1990 | Maekawa et al. | 49/349 X |

FOREIGN PATENT DOCUMENTS

| | | | |
|---|---|---|---|
| 57-1753 | 10/1958 | Belgium | 49/352 |
| 2323784 | 11/1974 | Fed. Rep. of Germany | 49/352 |
| 2637438 | 2/1978 | Fed. Rep. of Germany | 49/352 |
| 631130 | 10/1949 | United Kingdom | 49/352 |

*Primary Examiner*—Joseph M. Gorski
*Assistant Examiner*—S. Thomas Hughes
*Attorney, Agent, or Firm*—Daniel M. Stock; Roger L. May

[57] ABSTRACT

A window regulator 20 for a door 12 of vehicle 10 which is separately assembled and tested prior to assembly to the vehicle door. The vehicle door 12 has a window opening 13 defining on its lower edge the beltline 15 of the vehicle 10. A window 14 covers the window opening 13 in its closed position and is moved within an inner structural frame 16 which extends peripherally adjacent the perimeter of the door. An endless loop drive 22 having first and second horizontally extending runs 28 and 30 extending horizontally across a lower portion 26 of the frame 16. Means 32 are provided for reciprocally driving the first and second runs of the endless loop. The endless loop is connected to front and rear tape drives 46 and 48 by first and second cable clamps 50 and 52. The endless loop is preferably a cable 24 which is guided by first and second cable guide block 36 and 38 and a U-turn cable guide block 42. The front and rear tape drives 46 and 48 are routed through front and rear tape channels 66 and 68. Front and rear drive tapes 46 and 48 are connected to the window 14 near the top of the upper frame member 70. The method of the present invention includes the steps of assembling a window 14 and window regulator assembly wholly separate from the vehicle door 12. The assembly is then inserted and secured to the door. A selective operator 104 is then connected to the inner panel 98 of door 12.

3 Claims, 5 Drawing Sheets

METHOD OF ASSEMBLING A UNITIZED WINDOW SYSTEM FOR A VEHICLE DOOR

This is a divisional of co-pending application Ser. No. 561,856 filed on Jul. 30, 1990, now U.S. Pat. No. 5,035,083.

TECHNICAL FIELD

The present invention relates to a pre-assembled vehicle window assembly including a tape drive window regulator. More particularly, the invention relates to a vehicle window and regulator subassembly assembled as a unit wholly separate from the vehicle door and then installed as a unit into the vehicle door.

BACKGROUND ART

Vehicle window regulator mechanisms are well known in the art. An example of a prior art window regulator mechanism including a window regulator having a rigid strap affixed to the center of the window which pushes and pulls the window is disclosed in U.S. Pat. No. 4,642,941 to Staran.

Cable drive mechanisms having a vertically disposed cable and pulley system are disclosed in U.S. Pat. No. 4,547,993 to Kobayashi and U.S. Pat. No. 4,483,100 to Blankenburg, et al.

In recent years, tape drive systems have been developed such as those disclosed in U.S. Pat. No. 4,793,099 to Friese, et al., U.S. Pat. No. 4,433,509 to Seppala, U.S. Pat. No. 4,369,202 to Zavatkay, U.S. Pat. No. 4,660,325 to Bauer, et al. and U.S. Pat. No. 4,253,277 to Campbell, et al.

Problems experienced in the automotive industry relating to the above systems include complex on-line assembly procedures, front to rear pitching of the window within the window frame, the need to locate bulky mechanical elements of the window regulator mechanism within the door adjacent passenger areas and the need to provide a high vehicle beltline which limits the window height and styling possibilities.

Rigid strap assemblies affixed to the center of the window may encounter pitching front to rear if there is any misalignment or difference in front relative to rear frictional forces applied to the window. The rigid strap traverses the door vertically and necessitates additional door width at and above the passenger seating level. Further, the vehicle door beltline must be at a high enough level to accommodate the length of the rigid strap and regulator mechanism. The rigid strap is generally directly connected to the inner panel of the door during final assembly with the window being connected to the regulator mechanism online.

Cable drive systems are frequently centrally affixed to the bottom center of the window which leads to the pitching problem discussed above. Cable systems normally extend in a vertical orientation so that upon reciprocation of the cable, the window is moved up and down. The vertical orientation of the cable drive occupies potentially usable space at the passenger seating level and above because the cable drive components must be mounted within the door above the height of the seat. In addition, assembly of a cable drive system is normally done on-line as it is necessary to affix cable drive elements to the inner door panel. Final assembly is further complicated by the need to assemble and test the window regulator mechanism on-line with any adjustments or repair being normally performed subsequent to final assembly of the door.

Prior art tape drive systems while providing many advantages, normally require assembly on-line and location of regulator components above the level of the seat of the vehicle which limits the vehicle interior space. Further, prior art tape drive systems suffer from problems relating to providing a system which is easily adaptable to power or hand crank operation with appropriate mechanical advantage and hand crank efficiency.

These and other problems are solved by the improved vehicle window system of the present invention as summarized below.

DISCLOSURE OF INVENTION

The present invention relates to a window regulator having an endless cable loop which is in substantial part disposed in the bottom of the door and connected to front and rear tape drive mechanisms.

The present invention relates to a window and window regulator subassembly having an inner structural frame extending peripherally adjacent and within a portion of the perimeter of a vehicle door. The subassembly may be separately assembled remote from the vehicle door and has self-contained operational elements that do not require reinforcement by the vehicle door.

The present invention relates to a vehicle window regulator subassembly for a vehicle door having an inner panel and an outer panel defining a space below the beltline of the vehicle. The beltline of the vehicle is defined as the bottom edge of the window opening. The window regulator subassembly comprises a window, and a frame extending peripherally adjacent and within the perimeter of the door and window. An endless loop drive is connected to a lower portion of the frame and has first and second runs extending across the lower portion of the frame adjacent a lower edge of the door. Means are provided for reciprocally driving the first and second runs of the endless loop. A rear tape drive is attached to a rear edge of the window near the top of the window on one end and the first run of the endless loop on its other end. Similarly, a front tape drive is attached to a front edge of the window near the top of the window on one end and the second run of the endless loop on its other end. The window regulator subassembly is effective to control movement of the window between a closed position in which the window covers the window opening, and an open position in which the window is at least partially disposed below the beltline.

According to another aspect of the invention, a frame guide substantially encompasses front and rear tape drives within front and rear channel members of the frame, respectively. Front and rear channel members are interconnected on their upper ends by an upper frame member which is co-extensive with a top edge of the window.

The endless loop drive of the present invention offers several advantages. A drum drive roller reciprocally drives first and second runs of the endless loop drive. The drum drive roller is not aligned with the first and second runs, and is remote from the first and second runs while being operatively connected to the endless loop drive. The first and second runs are substantially confined within a housing that is mounted to a lower portion of the frame.

A U-turn guide for a reverse turn in the endless loop functions to route the endless loop between the first run and the second run. The endless loop is guided toward the drum drive roller by first and second directional guides which guide the first and second runs, respectively, in angular turns. The U-turn guide and the first and second guides are preferably molded plastic guide blocks having curved guide surfaces or grooves about which the endless loop is routed.

Cable clamps are secured to the cable, and include tape connector teeth that are adapted to be received by corresponding holes in the front and rear tape drives.

The drum drive roller preferably includes an internal gear which is adapted to be engaged by a pinion gear for rotation in a clockwise or counter-clockwise direction. The drive roller has a rim about which the endless loop is encircled and to which the endless loop is fastened so that rotation of the rim causes the endless loop to simultaneously take up and let out portions of the endless loop. The pinion gear may be rotated by a hand crank or by a reduction gear assembly and electrical motor as is well known in the art.

A spring is preferably connected to the endless loop to bias the endless loop counter to the force applied to the endless loop by the weight of the window. The force applied is preferably approximately equal to the weight of the window. The spring preferably comprises a constant force linear spring contained on a supply drum. The linear spring is connected on one end to one of the first and second runs of the endless loop. The spring supply drum is also rotationally connected to the frame so that forces developed by the window regulator are contained within the inner structural frame.

The method of the present invention relates to assembling a window and a window regulator assembly to a vehicle door. The method is accomplished by first assembling together as a unit a window, front and rear drive tapes, front and rear tape drive channels and a window regulator having endless loop to an inner structural frame. The unit is assembled wholly separate from the vehicle door. After assembly, the unit is inserted into the door and secured to the door. A selective operator for actuating a rotatable force transmitting means of the endless loop is then secured to an inner panel of the door to be accessible by a vehicle occupant.

According to another aspect of the method of the present invention, the assembly step further comprises routing front and rear drive though front and rear drive tape channels. The drive tapes are secured at their lower ends to the first and second runs of the endless loop. The upper ends of said front and rear drive tapes to an upper portion of the window at front and rear locations, respectively, are moveable in opposite directions simultaneously to cause the window to open and close by application o force to said front and rear locations of the window. The first and second runs of the endless loop are anchored to the inner structural frame so that forces applied by the regulator are distributed to the inner structural frame independently of the vehicle door.

The method of the present invention may further comprise the step of testing the window regulator after assembly as a unit but before inserting the unit into the door. Testing may be performed by moving the window through manipulation of the window regulator.

One object of the present invention is to provide a window regulator system for a vehicle door which provides a smooth operating window free from pitching motion.

Another object of the present invention is to provide a window regulator mechanism which can be confined to the lower edge of the door to permit maximization of lateral space within a vehicle above the seat level. The present invention also provides additional styling freedom to lower the beltline of the vehicle and expand the size of vehicle door windows.

A further object of the present invention is to provide a subassembly which can be assembled completely off-line, and tested for window operation prior to installation of the subassembly within the door in the final assembly operation.

It is an additional object of the present invention to provide a vehicle window regulator mechanism which is unitary in design and construction and requires no structural support of the regulator components by the inner or outer door panels.

An object of the method of the present invention is to provide a method of assembling a window and a window regulator assembly to a vehicle door as a subassembly which may be assembled together as a unit wholly separate from the door.

Another object of the method of the present invention is to provide a method wherein a subassembly including window operating means and the window is separately assembled as a unit, inserted into the door as a unit, and then connected to its actuator on the inner panel of the door.

Other objects and advantages of the present invention will become readily apparent in view of the attached drawings and detailed description of the invention provided below.

BEST MODE FOR CARRYING OUT THE INVENTION

Figure 1:
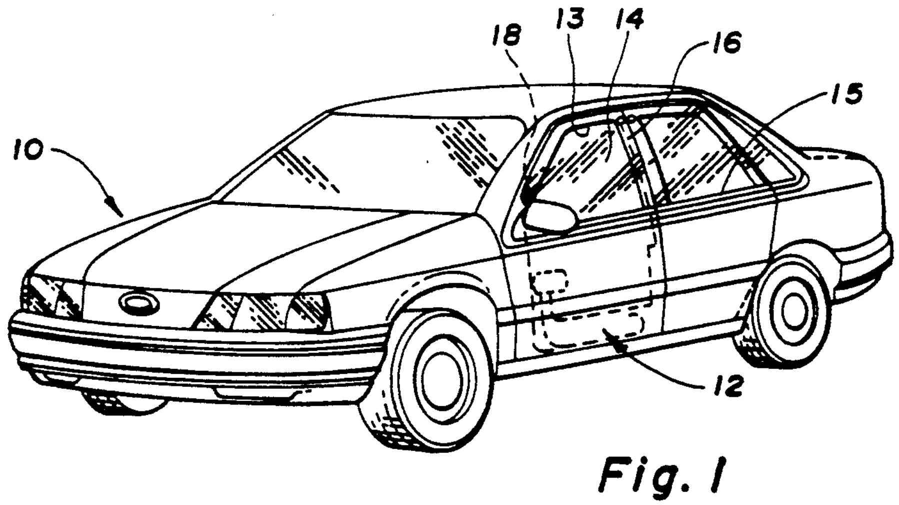
FIG. 1 is a perspective view of a vehicle showing the lower beltline achievable by the present invention.

Referring now to the drawings, and in particular, FIG. 1, a vehicle 10 having a door 12 with a window opening 13 is shown. A window 14 preferably a flush glass window is disposed in its closed position covering the window opening 13. A beltline 15 defined as the lower edge of the window opening 13 may be lower in the door as compared to prior art doors due to the structure of the window regulator assembly of the present invention. An inner structural frame 16 is partially visible in FIG. 1 behind the window 14. Also, a tape drive system 18 is generally shown in phantom lines.

The tape drive 18 preferably uses drive tape that may be loaded for tension or compression. One suitable type of tape is available from E.I. DuPont de Nemours under their registered trademark DYMETROL for copolyester elastomeric mechanical drive tape.

Figure 2:
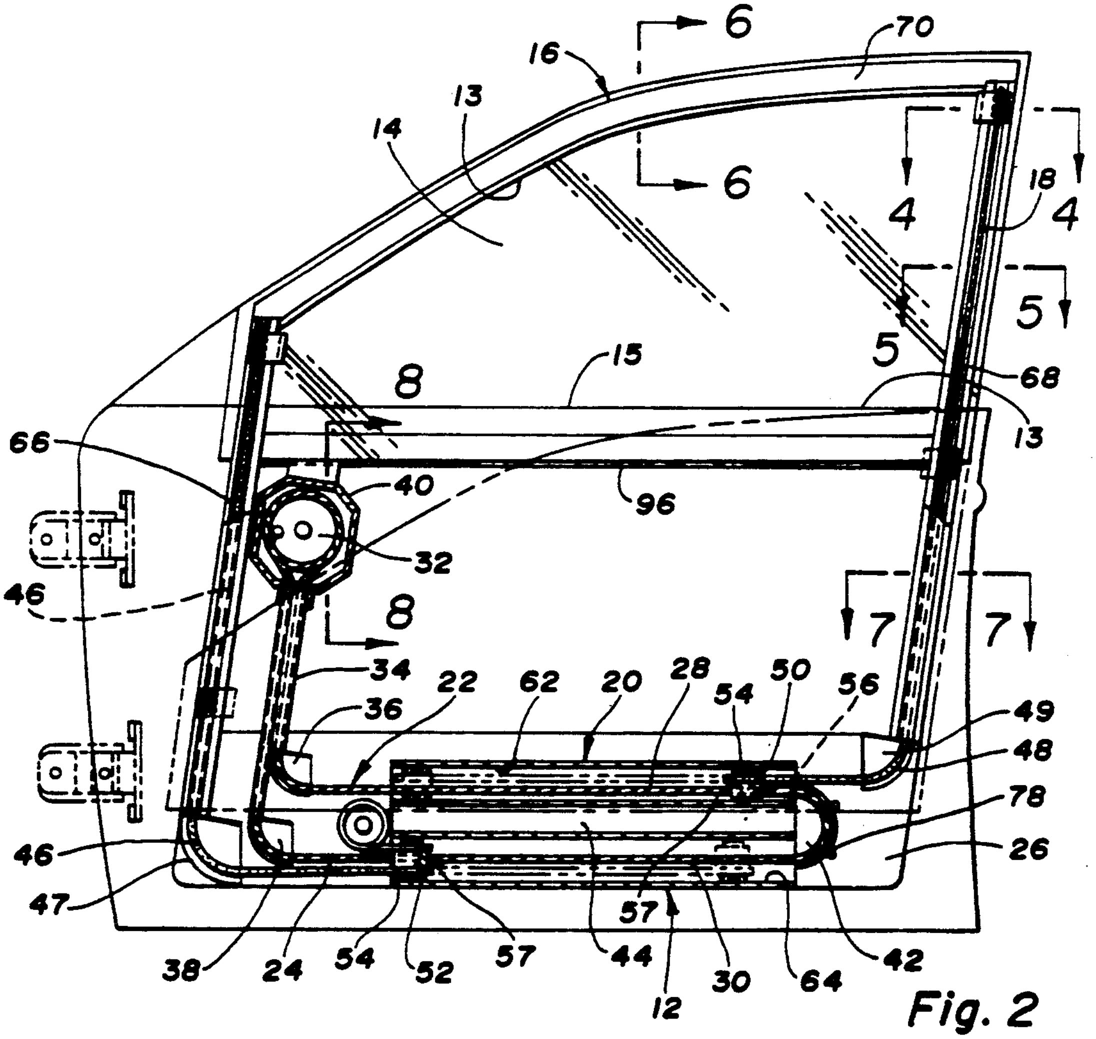
FIG. 2 is a elevational view of the inner structural frame of the present invention as installed in a door.
Figure 3:
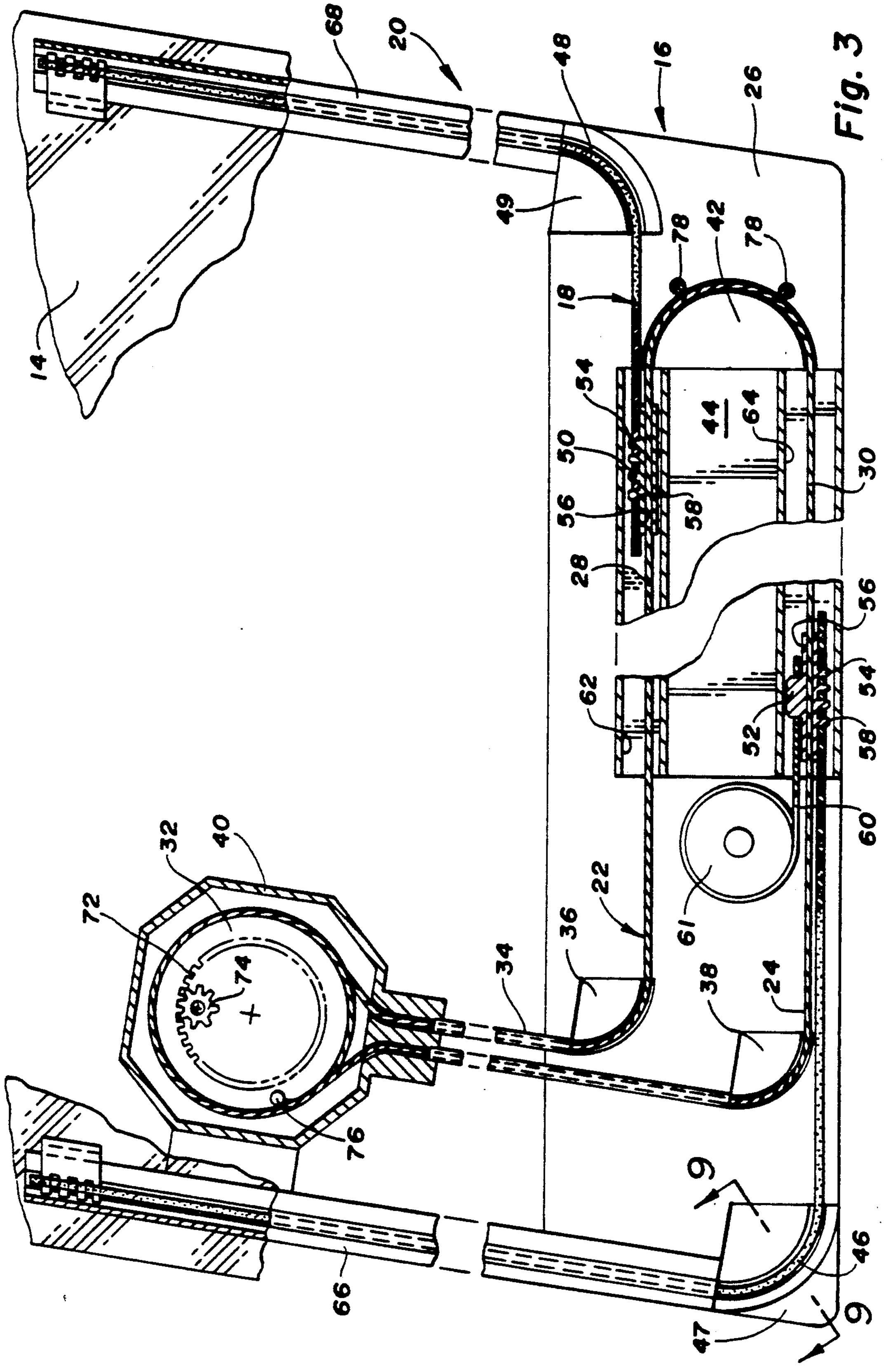
FIG. 3 is a fragmentary elevational view showing the endless loop drive and tape drive of the present invention.

Referring now to FIGS. 2 and 3, a regulator subassembly 20 is shown. The regulator subassembly 20 includes an endless loop drive 22. The endless loop drive includes a cable 24 which forms the endless loop of the endless loop drive. A lower portion 26 of the frame 16 supports first and second runs 28 and 30 of the endless loop drive 22. First and second runs extend substantially horizontally in the door adjacent a lower edge of the door. The term substantially horizontally as used herein should be understood as being across the door with only limited inclination vertically so that vertical space requirements may be minimized, if desired. The location of the first and second runs in a lower portion 26 of the frame 16 is important in that it permits maximum drop of the window relative to the door and allows for additional styling freedom in locating the beltline 15 of the vehicle.

A pulley 32 comprises a part of the endless loop drive 22. The cable 24 is wrapped about the pulley 32, and connected to the pulley so that rotation of the pulley 32 in a clockwise or counter-clockwise direction will result in simultaneous take up and unwinding of the cable from the pulley 32. The cable is routed through a flexible conduit 34 extending between the pulley 32 and first and second cable guide blocks 36 and 38. The pulley is located within a housing 40 that is secured to the inner structural frame 16.

Forces applied to the pulley are constrained by the inner structural frame 16 without the need to transmit such forces to the door 12.

A U-turn cable guide block 42 is provided at the opposite end of the first and second runs 28 and 30 from the first and second cable guide blocks 36 and 38. The U-turn cable guide block 42 routes the cable between the first and second runs in a reverse turn.

A drive housing 44 is preferably provided to house the first and second runs 28 and 30. The first and second cable guide blocks and the U-turn cable guide block are fixedly mounted on the inner structural frame 16 as is the drive housing 44. A front drive tape 46 extends between the second run 30 of a cable 24 and the window 14. In the illustrated embodiment, the front drive tape 46 is guided through a slightly acute but nearly perpendicular curve by a front drive tape guide block 47 which is also secured to the inner structural frame 16. A rear drive tape 48 extends between the first run 28 of the cable 24 and the window 14, and likewise is routed through a rear drive tape guide block which routes the rear drive tape in a slightly obtuse but nearly perpendicular turn. The rear drive tape 48 is connected to the cable by a first cable clamp 50. Front drive tape 46 is connected to the cable 24 by a second cable clamp 52. The length of the first and second runs is at least equivalent to the length of the total vertical displacement of the window as it is shifted from its full open position to its full closed position.

First and second cable clamps 50 and 52 each include a plurality of tape engagement teeth 54. The first and second cable clamps also include a cable engagement means 56. Cable engagement means 56 include a cable opening formed through the cable clamp through which the cable 24 is routed. The cable clamps may then be deformed or otherwise secured to the cable by well-known cable fastening devices.

The front and rear drive tapes 46 and 48 preferably include a plurality of holes 58, or perforations, which may extend either the full length of the drive tape or for a limited portion of the drive tape length near the ends of the drive tape. The holes 58 are adapted to receive the tape engagement teeth 54 of the first and second cable clamps 50 and 52. Preferably, four tape engagement teeth 54 are formed on the cable clamps which are received in four holes 58 of the drive tapes.

A constant force retraction spring 60 is preferably provided to counterbalance the weight of the window 14 so that substantially equal force is required to raise or lower the window 14. For example, acceptable constant force retraction springs 60 are commercially available from Ametek, Inc. under their registered mark NEG'ATOR. The retraction spring 60 is wound on supply drum 61 having an outer diameter slightly larger than the free inner diameter of the spring 60. The supply drum rotates on an axle (not shown) which is secured to the inner structural frame 16.

Figure 11:
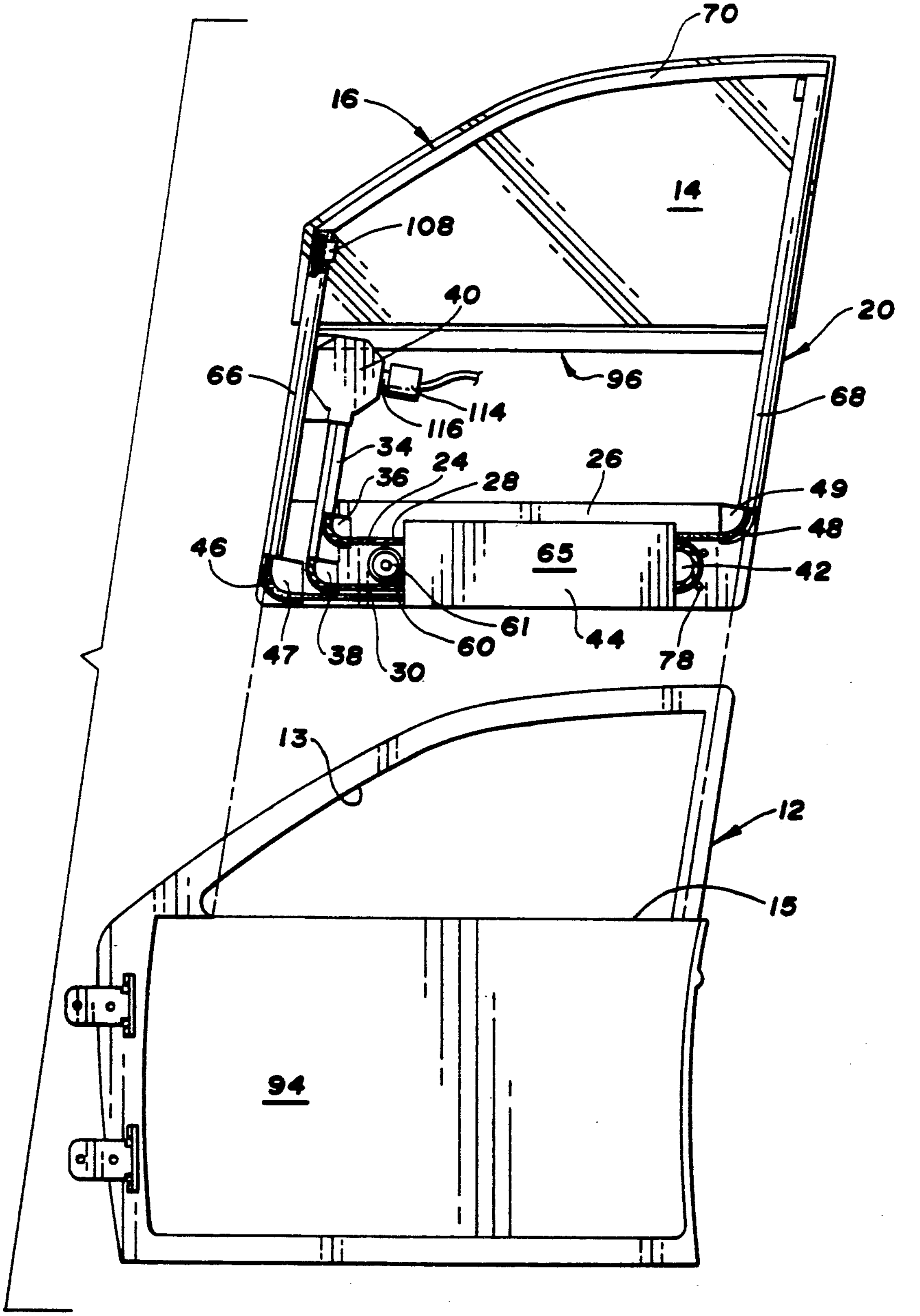
FIG. 11 is an elevational view showing the window and regulator subassembly just prior to insertion into a vehicle door in accordance with the present invention.

First and second drive housing channels 62 and 64 are provided in the drive housing 44. The first and second drive housing channel 62 and 64 provides a protected track to which the first and second runs 28 and 30 may reciprocate along with the first and second cable clamps 50 and 52. The channels may be covered by a cover plate 65, as shown in FIG. 11.

A front tape channel 66 and a rear tape channel 68 extend from front drive tape guide block 47 and rear drive tape guide block 49, respectively, to an upper frame member 70. Upper frame member 70 is preferably a box channel which follows in close proximity to the upper edge of the window 14. Front tape channel 66 and rear tape channel 68 are special channels having an opening on one side, the construction of which will be described more fully below with reference to FIGS. 4, 5 and 7.

The pulley 32 is sized to provide the proper mechanical advantage for manual operation of the window and minimize the number of turns required to raise or lower the window. The pulley 32 preferably includes an internal gear 72 which is adapted to be engaged and driven by a pinion gear 74. The internal gear 72 and pinion gear 74 are shown schematically in FIG. 3. A cable fastener 76 secures the ends of the cable 24 to the pulley 32.

A plurality of guide pins 78 are affixed to the lower portion 26 of the frame 16 adjacent the outer periphery of the cable as it is routed about the U-turn cable guide block 42. Guide pins 78 are used to assist in assembly of the cable to the lower portion 26 of the frame 16.

Figure 4:
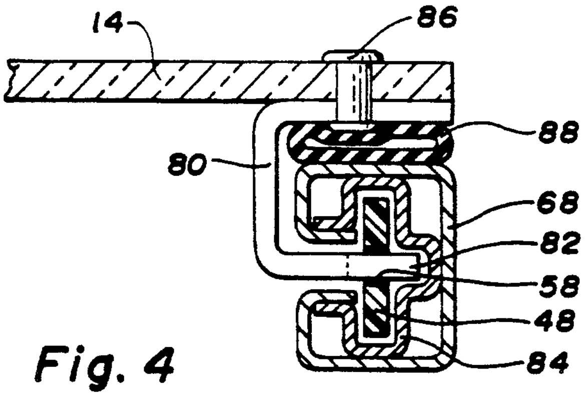
FIG. 4 is a cross-sectional view taken along the line 4—4 in FIG. 2.

Referring now to FIG. 4, an anchor bracket 80 for the rear drive tape 48 is shown. The anchor bracket for the front tape is essentially a mirror image of the rear tape anchor bracket and will not be specifically described. The anchor bracket 80 includes a plurality of teeth 82 which are adapted to engage the holes 58, or perforations, in the rear drive tape 48. A tape guide 84 is retained within the rear tape channel 68 by clamping, welding or other fastening techniques. A fastener 86, such as a blind fastener or rivet, connects the anchor bracket 80 to the window 14 adjacent the upper edge of the window as shown in FIG. 1. A seal 88 is affixed between the rear tape channel 68 and the window 14 to prevent fluid and air leakage between the window 14 and the inner structural frame 16.

Figure 5:
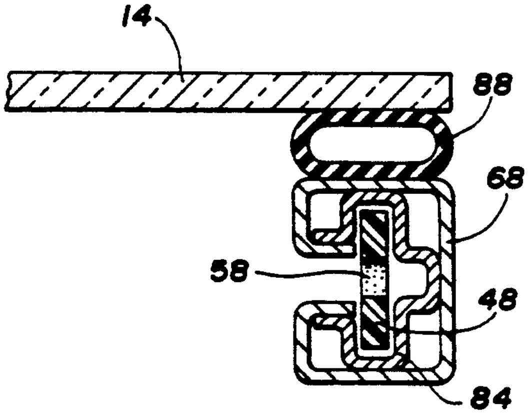
FIG. 5 is a cross-sectional view taken along the line 5—5 in FIG. 2.

Referring now to FIG. 5, the rear tape channel 68 is shown at a location in which the anchor bracket 80 is not currently disposed. The anchor bracket 80 is intended to pass through the section shown in FIG. 5 as the window is raised or lowered. The rear drive tape 48 is shown to include perforations 58 which are essentially non-functional at that location. The rear tape channel 68 contains the tape guide 84 which in turn locates and guides the rear drive tape 48. The seal 88 is connected to the rear tape channel 68 and slidingly engages the inner surface of the window 14 to provide a seal. The seal, as shown in FIG. 5, is slightly compressed while the seal, as shown in FIG. 4, is more substantially compressed by the anchor bracket 80.

Figure 6:
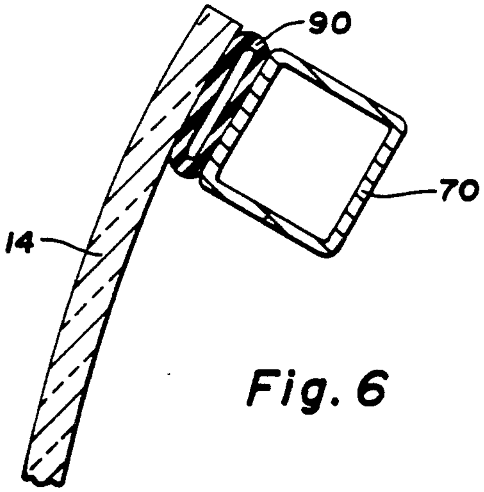
FIG. 6 is a cross-sectional view taken along the line 6—6 in FIG. 2.

Referring now to FIG. 6, a section of the upper frame member 70 and window 14 is shown. A seal 90 is provided to prevent leakage of fluid and air between the window and the upper frame member 70. Upper frame member 70 is preferably a channel. In the illustrated embodiment, the channel is a simple square cross-section channel member. However, many different configurations could satisfactorily provide support and reinforcement between the upper ends of the front tape channel 66 and the rear tape channel 68. It is anticipated that a "hard top" embodiment could be developed that would allow the elimination of upper frame member 70.

Figure 7:
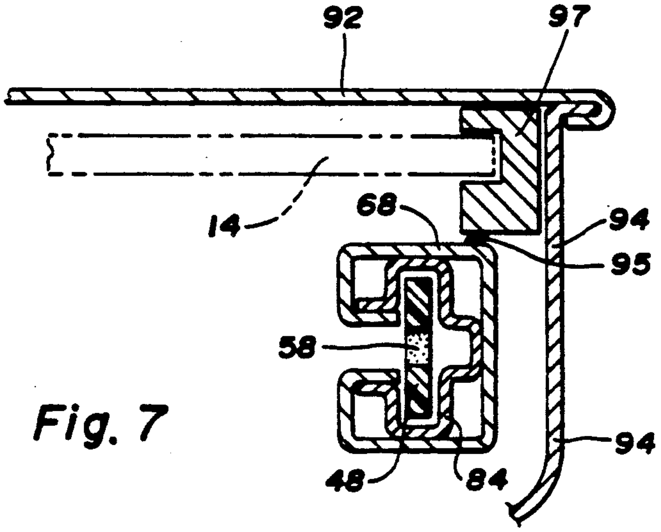
FIG. 7 is a cross-sectional view taken along the line 7—7 in FIG. 2.

Referring now to FIG. 7, a section of the rear tape channel 68 is shown below the beltline 15 of the door. The rear tape channel 68 encloses the tape guide 84, and the rear drive tape 48 is guided by the tape guide 84. The rear tape channel 68 is spaced from an outer door panel 92 and is attached with a plurality of brackets 95, preferably provided on the subassembly 20, to an inner door panel 94. The window 14 is supported by the anchor bracket 80 at a location above the section of FIG. 7, and is held by one or more guides 97 located below the beltline in spaced relationship to both the outer door panel 92 and rear tape channel 68.

Figure 8:
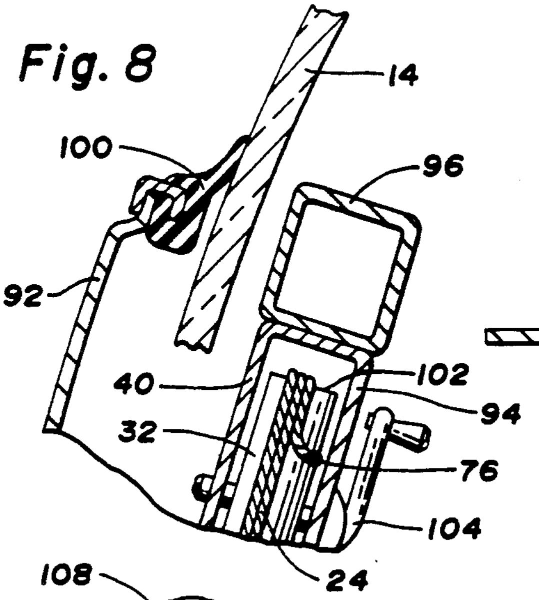
FIG. 8 is a cross-sectional view taken along the line 8—8 in FIG. 2.

Referring now to FIG. 8, a beltline frame 96 forming part of the inner door panel 94 is shown. The inner door panel 94 is connected to the beltline frame 96 by a hem flange or other means. The pulley 32 and housing 40 are connected to the inner structural frame 16 and placed adjacent the beltline frame 96 after assembly. A seal 100 is shown connected to the outer door panel 92 and engaging the window 14 in a wiping relationship. The pulley 32 has an outer rim 102 about which the cable 24 is wrapped. The cable 24 winds and unwinds over the rim 102 by turning a hand crank 104 which rotates the pulley 32. The cable 24 is wrapped about the rim 102 a sufficient number of times to permit full reciprocation of the window between its full closed and full open positions.

Figure 9:
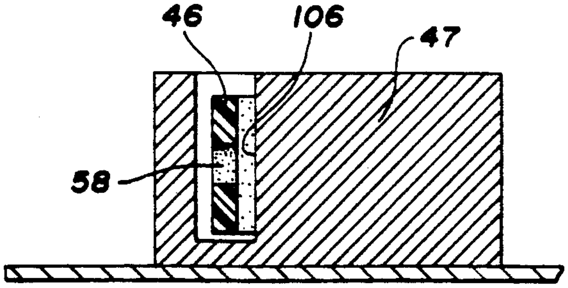
FIG. 9 is a cross-sectional view taken along the line 9—9 in FIG. 3.

Referring now to FIG. 9, the front drive tape guide block 47 is shown in cross-section. The front tape 46 is disposed within a groove 106. The guide block 47 is preferably formed of a low friction polymeric material to minimize friction as the tape 46 is moved through the guide groove 106. Rear drive tape guide block 49 is similarly constructed.

Figure 10:
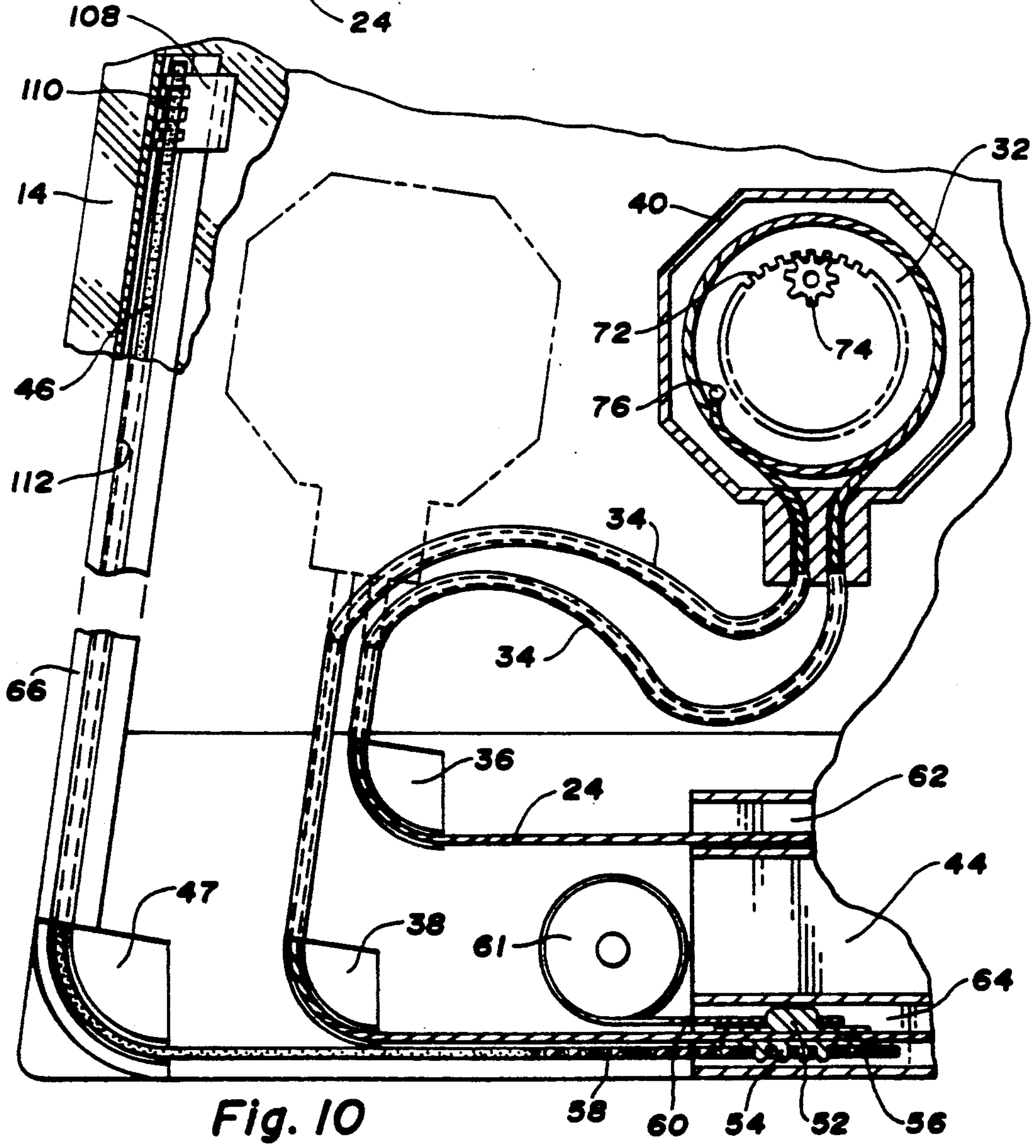
FIG. 10 is a fragmentary elevational view of the endless loop drive and tape drive showing an alternative location of the rotatable drum in accordance with the present invention.

Referring now to FIG. 10, design possibilities offered by the present invention as a result of the flexible conduit 34 are illustrated. It is desirable to have freedom in the location of the pulley 32 so that the hand crank 104 may be located in a convenient location. The length of the cable 24 and conduit 34 may be minimized in power window applications by locating the pulley as close as possible to the first and second runs 28 and 30. By merely lengthening the cable 24 and flexible conduit 34, the pulley 32 may be located at a more accessible location on the inner door panel 98. The flexible conduit 34 constrains the cable 24 and forces it to shift coaxially within the flexible conduit 34 regardless of the location of the pulley 32.

Also shown in FIG. 10 is the inner connection between the front tape and window. An anchor bracket 108 is secured to the window and to the front drive tape by a plurality of teeth 110 which are received in the perforations 58 of the front drive tape 46. The tape is constrained within a tape guide 112 which extends the length of the front tape channel 66.

Referring now to FIG. 11, the method of the present invention will be described. The window 14 and regulator subassembly 20 is shown fully assembled just prior to insertion into the door 12. The fully assembled regulator subassembly and window are inserted in the space between the outer door panel 92 and the inner door panel 98.

A key to the present invention is that the entire regulator subassembly 20 is assembled to an inner structural frame 16 wholly separate from the door. This construction method lends itself to modular assembly of the entire window and regulator subassembly as a unit. A window 14 is assembled with front and rear drive tapes 46 and 48, tape drive channels 66 and 68, the endless loop drive 22 and the inner structural frame 16. After this entire unit is assembled, it is inserted into and secured to the door by brackets 95 that are clipped to the subassembly 20, and fastened by clip fasteners to the inner door panel 94 at spaced locations. The hand crank or electric switch, which is accessible in the passenger compartment of the vehicle, is then connected to or through the inner door panel to provide selective operation of the endless loop drive by the vehicle occupant.

The step of assembling the window 14 and regulator subassembly 20 may further comprise the steps of securing the upper ends of the front and rear tape channel 66 and 68 to an upper portion of the frame 70. The lower ends of the front and rear drive channels are secured to the lower portion of the frame 26. The front and rear drive tapes 46 and 48 are placed in the front and rear drive channels and secured to the first and second runs 28 and 30 of the endless loop 22 while the upper ends of the drive tapes 46 and 48 are connected to the window 14 near the top edge of the window. The first and second runs of the endless loop are anchored to the lower portion 26 of the frame 16. The pulley 32 may be either connected to the inner structural frame 16 or supported merely by the flexible conduit 34 since rotation of the pulley 32 will cause the cable to move within the flexible conduit regardless of whether the pulley 32 is fixed relative to the inner structural frame.

As shown in FIG. 11, the pulley 32 may be actuated by a motor 114 through a gear reduction set 116 as is well-known in the art.

A further unique aspect of the method of the present invention is the ability to test the window regulator after assembly, but before installing the unit into the door. The window regulator is fully supported by the inner structural frame 16 and may be manipulated prior to assembly to the door without a special fixture. This is important in simplifying vehicle assembly operations since the window regulator may be assembled entirely off-line as a modular unit and shipped to the line as an operational and fully tested module.

The preceding description is of a preferred embodiment of the present invention. This description is intended to be illustrative of a preferred form of the invention. Modifications and enhancements of the present invention will be apparent based upon the above description. The scope of the present invention should be measured by the following claims, and not limited by the above description of the preferred embodiment.

I claim:

1. A method of assembling a window and window regulator assembly to a vehicle door, the method comprising the steps of:

providing an inner structural frame to which a window, drive means for raising and lowering said window, and regulator means for actuating said drive means can be assembled to form a unit wholly separate from the vehicle door;

assembling said window to the inner structural frame;

assembling said regulator means to the inner structural frame including anchoring first and second runs of an endless loop of said regulator means to said inner structural frame;

placing front and rear drive tapes in front and rear drive tape channels of the inner structural frame;

securing lower ends of aid front and rear drive tapes to first and second runs of the endless loop of the said regulator means;

securing upper ends of said front and rear drive tapes to an upper portion of said window at front and rear locations, respectively, said first and second runs of said endless loop of said regulator means being movable in opposite directions simultaneously to cause the window to open and close by application of force to said front and rear locations of said window;

inserting the unit after assembly into the door and securing the unit to the door; and connecting a selective operator to said regulator means and to an inner panel of said door.

2. The method of claim 1 further comprising the step of:

testing said regulator means after assembly to the inner structural frame but before inserting the unit into the vehicle door by moving the window relative to the inner structural frame by applying rotatable forces to said regulator means.

3. The method of claim 1 wherein the step of anchoring first and second runs includes:

anchoring the first and second runs of said endless loop parallel to a lower horizontally extending portion of the inner structural frame such t hat the first and second runs extend substantially parallel to the horizontally extending portion.

* * * * *